US007395751B2

(12) United States Patent
Liu (10) Patent No.: US 7,395,751 B2
(45) Date of Patent: Jul. 8, 2008

(54) BEVERAGE-MAKING APPLIANCE (75) Inventor: Ka Lok Joe Liu, Hong Kong (HK)

(73) Assignee: Main Power Electrical Factory Ltd., Kowloon, Hong Kong (CN)

( * ) Notice: Subject to any disclaimer, the term of this patent is extended or adjusted under 35 U.S.C. 154(b) by 720 days.

(21) Appl. No.: 10/789,650

(22) Filed: Feb. 27, 2004

(65) Prior Publication Data

US 2006/0086255 A1 Apr. 27, 2006

(51) Int. Cl.
*B02C 18/00* (2006.01)
*A23L 1/00* (2006.01)
*A47J 43/06* (2006.01)

(52) U.S. Cl. .............................. 99/348; 99/357; 99/484; 99/510; 241/101.8; 366/197; 366/294

(58) Field of Classification Search .................... 99/510, 99/492, 509, 348, 484, 357, 286, 287; 241/101.8, 241/101.6, 101.01; 366/197, 199, 294, 298
See application file for complete search history.

(56) References Cited

U.S. PATENT DOCUMENTS

| 2,571,316 | A | * | 10/1951 | Guilder ...................... 416/111 |
| 2,801,545 | A | * | 8/1957 | Schottle .......................... 74/16 |
| 3,916,776 | A | * | 11/1975 | Arao et al. .................... 99/503 |
| 4,613,086 | A | * | 9/1986 | Granum et al. .......... 241/101.8 |
| 4,786,002 | A | * | 11/1988 | Mitsubayashi et al. ... 241/101.8 |
| 6,012,837 | A | * | 1/2000 | Thuma ........................ 366/294 |
| 6,189,441 | B1 | * | 2/2001 | Beaudet et al. ............... 99/492 |
| 6,302,014 | B1 | * | 10/2001 | Kuan ........................... 99/510 |

FOREIGN PATENT DOCUMENTS

JP      62-95122    * 10/1985   ................. 366/294

* cited by examiner

*Primary Examiner*—Reginald L Alexander
(74) *Attorney, Agent, or Firm*—Alix, Yale & Ristas, LLP (57) ABSTRACT An ice beverage-making apparatus includes a housing, an electric motor located within the housing, a torque transmission supported by the housing and receiving input from the electric motor and providing a first output shaft and a second-speed output shaft that rotates at a different speed than the first output shaft. The apparatus further includes an ice crushing module supported by the housing and receiving torque from the first output shaft, and a blending module receiving torque from the second output shaft.

22 Claims, 10 Drawing Sheets

BEVERAGE-MAKING APPLIANCE

BACKGROUND OF THE INVENTION

The present invention relates to household ice beverage-making appliances. More particularly, although not exclusively, the invention relates to a kitchen appliance for shaving ice and blending the shaved ice with a flavoured syrup.

Ice shavers that blend shaved ice with flavoured syrup are known. These comprise one electric motor for driving the ice-cutting blades and another electric motor for driving the blending paddles or whisks. These are usually heavy-duty appliances used in commercial fast-food establishments.

OBJECT OF THE INVENTION

It is the object of the present invention to provide the consumer with a cost-effective appliance in which ice cubes, frozen fruit, ice cream, nuts, crackers or chocolate for example can be shaved and blended with syrup or other liquid or flavouring in a single operation.

DISCLOSURE OF THE INVENTION

There is disclosed herein a beverage-making apparatus, comprising:
a housing,
an electric motor located within the housing,
a torque transmission supported by the housing and receiving input from the electric motor and providing a first output shaft and a second-speed output shaft that rotates at a different speed than the first output shaft,
a crushing module supported by the housing and receiving torque from the first output shaft, and
a blending module receiving torque from the second output shaft.

Preferably, the second-speed output shaft rotates at a different speed and in a different direction than the first output shaft.

Preferably, the crushing module comprises a contoured crushing disk that bears down upon ice, and a blade against which is the ice is crushed by the crushing disk.

Preferably the crushing disk is attached to the first output shaft.

Preferably the blending module comprises a whisk driven by the second output shaft and a vessel into which the whisk depends.

Preferably, the apparatus further comprises a second whisk driven by the first output shaft.

Preferably the torque transmission comprises a gearbox.

Preferably the first and second output shafts are co-linear and extend from opposite sides of the gearbox.

Preferably the housing comprises a base upon which the vessel is supported.

Preferably the crushing module comprises a hinged lid.

Preferably, the apparatus further comprises a funnel depending from the blade toward the blending module.

Preferably, the blending module comprises a vessel lid fitted to the vessel, the vessel lid comprising a vessel lid upper having a coupling attached to the second output shaft, and a lid lower through which torque is transmitted from the coupling to the whisk.

Preferably, the crushing disk comprises a boss, an outer ring coaxial with the boss and two diametrically opposed contoured paddles positioned between the boss and the outer ring for bearing down upon the beverage ingredient.

Preferably, the boss includes a bore having splines for coupling with the output.

Preferably, the paddles have a pitch that forces beverage ingredient at a front of the paddles against the blade.

Preferably, the blade is positioned at the base of the crushing module.

Preferably, the blending module has a coupling for releasably engaging it with the housing.

Preferably, the coupling is a bayonet type coupling.

Preferably, the blending module comprising a blending housing having a coupling for receiving torque from the torque transmission, a second torque transmission supported by the blending housing and receiving input from the coupling and providing a first blending output shaft and a second-speed blending output shaft that rotates at a different speed than the first output shaft, the first output shaft being positioned within the second output shaft, and a first whisk receiving torque from the first output shaft and a second whisk receiving torque from the second output shaft.

Preferably, the second blending output shaft rotates in a different direct to the first blending output shaft.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

In the accompanying drawings there is depicted schematically an ice crushing and blending appliance. The appliance comprises a plastics housing comprising a base 5 having a bottom 6. The base supports an intermediate housing 4 housing a number of components beneath a cover 3.

There is a top housing cover 2 above the intermediate housing cover 3 and within the top housing cover 2 there is located an ice crushing module comprising a crushing disk 12.

There is a gearbox comprising a number of gears 27, 29, 31 etc positioned within the intermediate housing 4. The gearbox conveys torque from an electric motor 25 to both the crushing module and blending module. The electric motor also drives a fan 20 to defuse heat from the motor.

Figure 8:
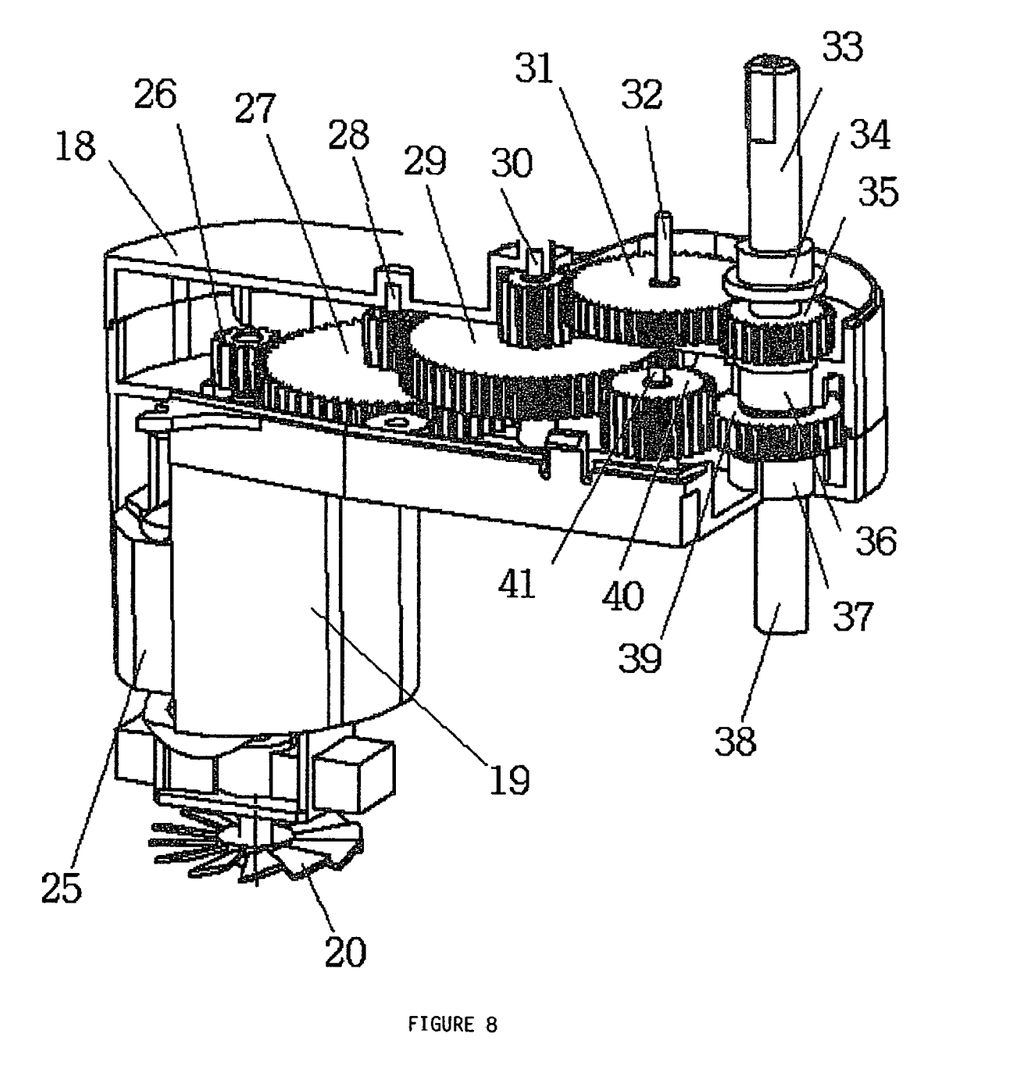
FIG. 8 is a schematic cut-away perspective illustration of a gearbox forming part of the appliance of FIGS. 1 to 3.

As best illustrated in FIG. 8, the gearbox 18 houses the output pinion 26 of the motor 25 and a number of intermediate gears 27, 29, 31, 39 and 40 mounted between a pair of gearbox plates 18 and 19—some of which have associated pinions 28 and 30. The specific arrangement of gears and pinions will not be described in detail—suffice to say that they result in reduced speed/increased output torque at main shaft upper 33 and main shaft lower 38 as compared with that of the motor output pinion 26.

The main shaft upper 33 and main shaft lower 38 extended vertically in a co-linear manner, but they are not fixed to one another. Moreover, the arrangement of gears within the gearbox results in different rotational speed and torque at each shaft 33 and 38. Typically, the main shaft upper 33 rotates at higher speed/lower torque than the main shaft lower 38. There is a middle bushing 36, an upper bushing 34 and a lower bushing 37 as depicted.

The crushing module includes a lid 1 which is removed to enable ice to be delivered to the module. The crushing disk 12 is a removable contoured item that fits upon the main shaft upper by virtue of splined interaction therewith.

There is a blade 10 fixed above a funnel 11 at the base of the crushing module. Rotation of the crushing disk upon the ice within the module forces the ice against the blade 10 which then shaves the ice and dispenses the ice shavings through the funnel 11 en route to the blending module.

Figure 1:
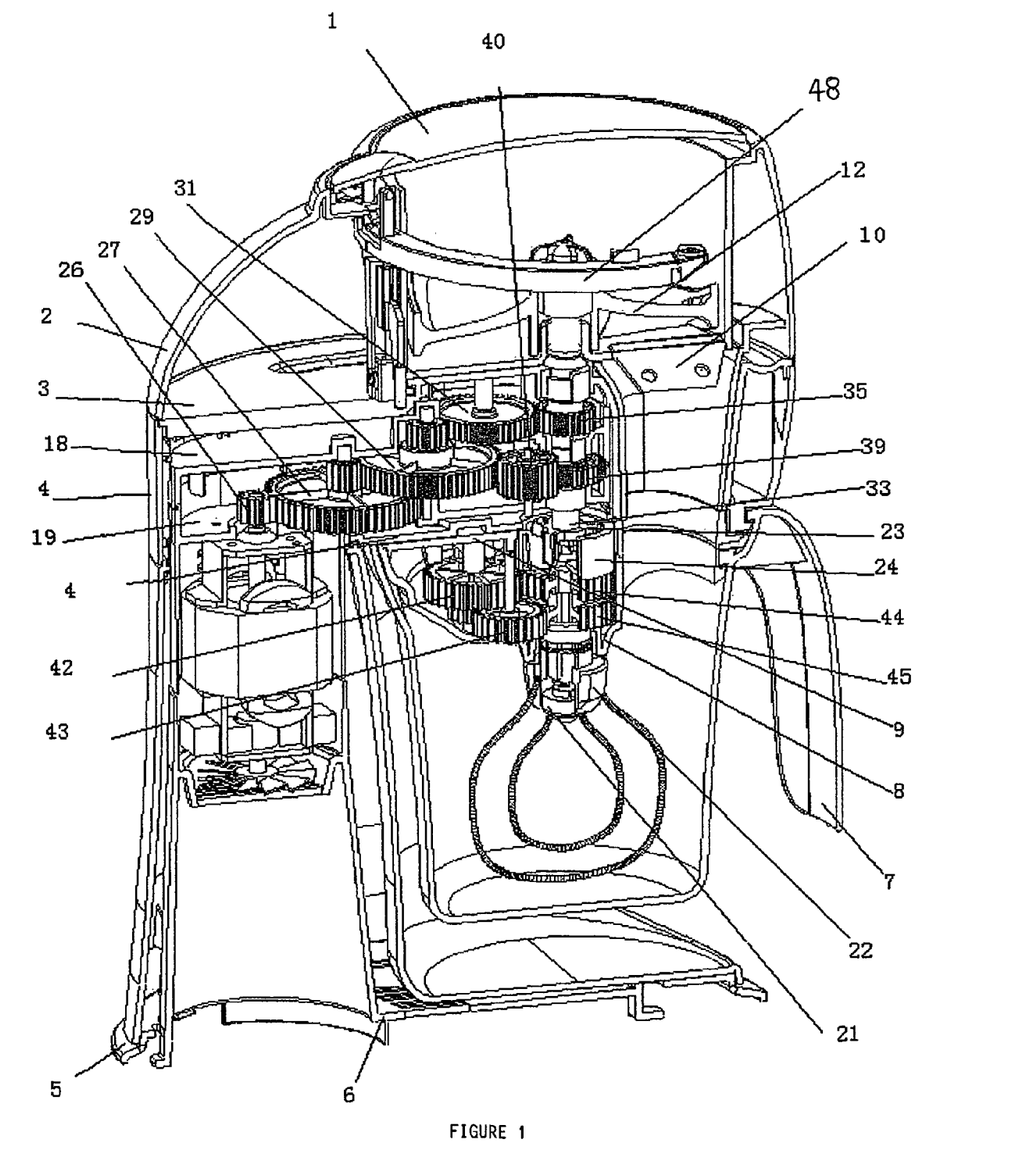
FIG. 1 is a schematic cut-away perspective illustration of an ice beverage-making appliance.
Figure 2:
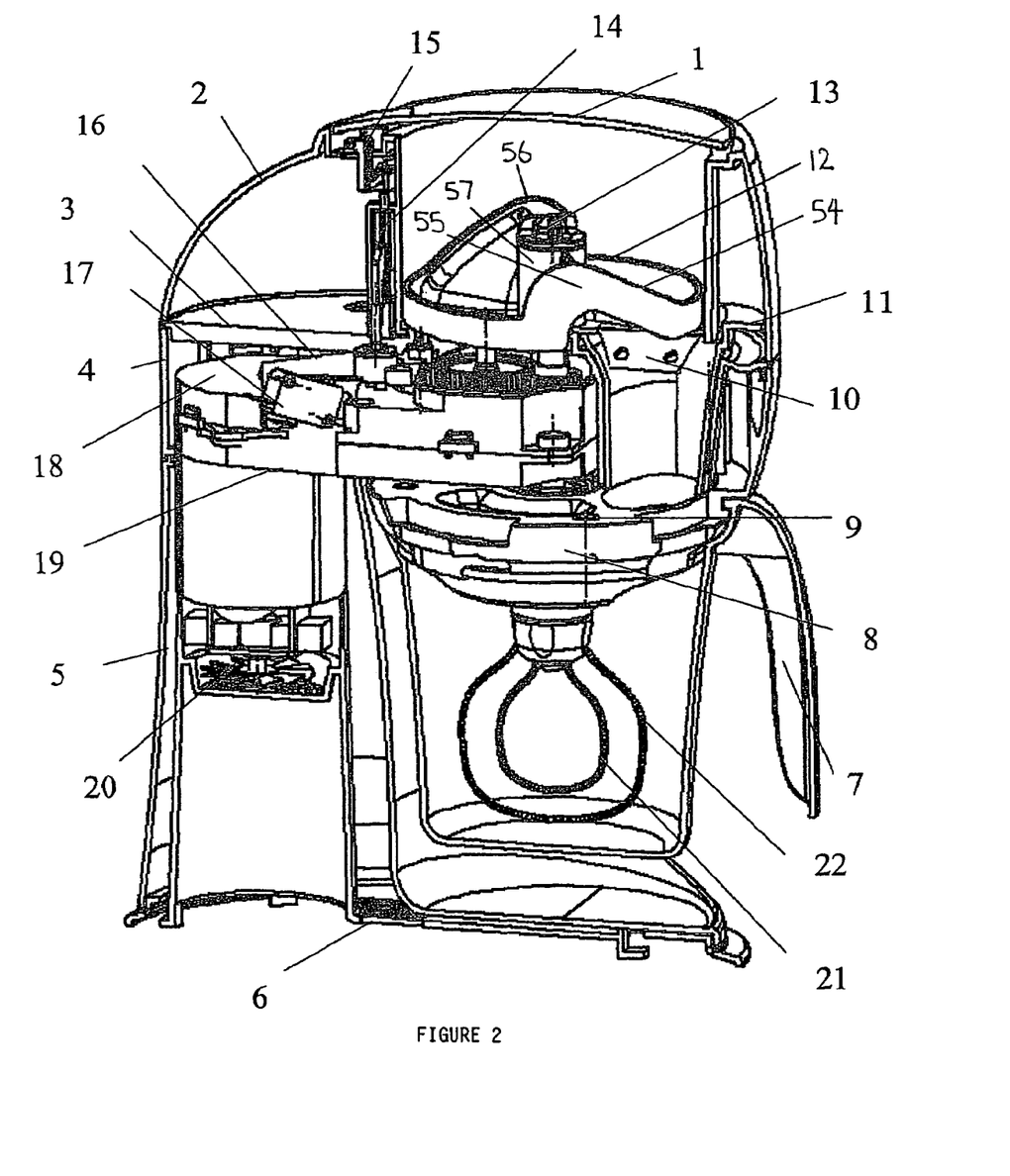
FIG. 2 is another schematic cut-away perspective illustration of the ice beverage-making appliance.
Figure 3:
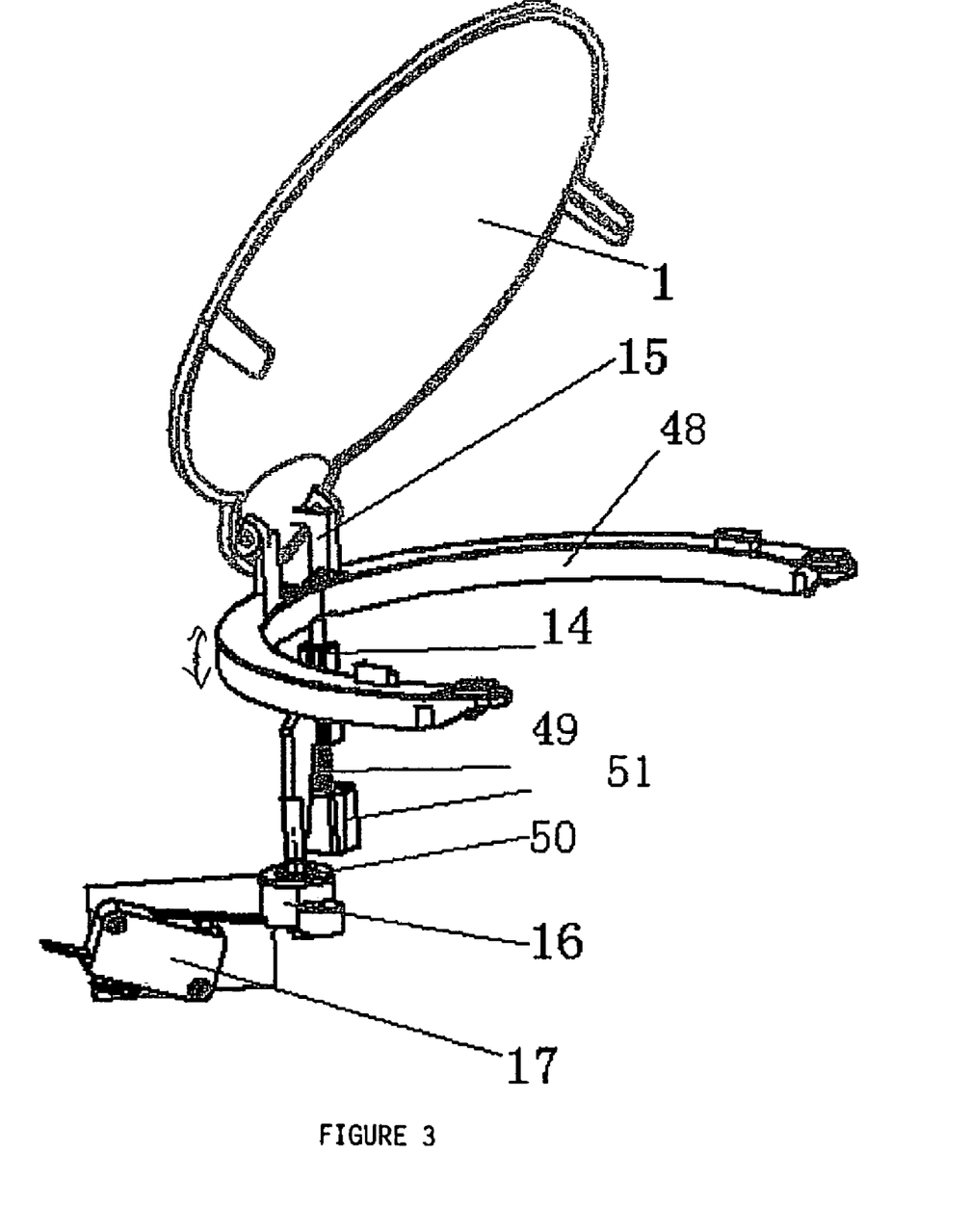
FIG. 3 is a schematic perspective illustration of other components of the ice beverage-making appliance.
Figure 7:
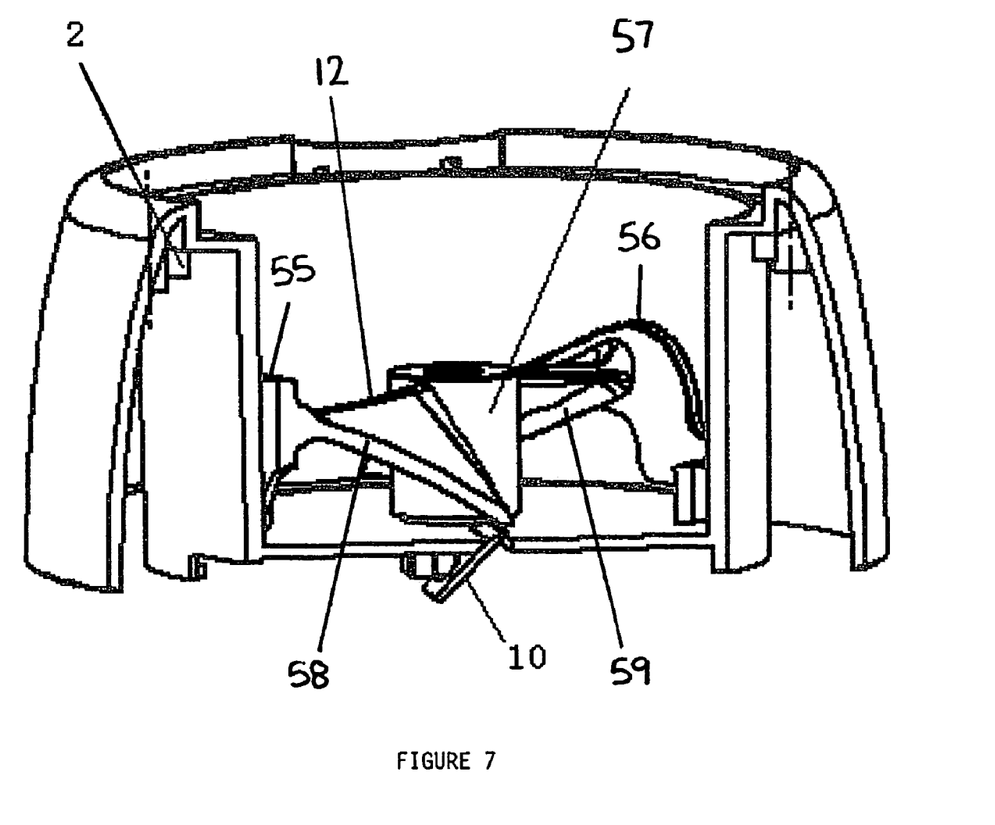
FIG. 7 is a schematic perspective cut-away illustration of the ice-crushing module.

The crushing disk 12 best depicted in FIGS. 1, 2 and 7 is contoured so that on rotation, the ice cubes are wedged downwardly against the blade 10. Crushing disk 12 comprises a boss 57 having a central bore with splines for interaction with the main shaft upper. Coaxial with boss 57 is an outer ring 54 having two diametrically opposed contoured portions 55, 56. Diametrically opposed paddles 58, 59 extend from the boss 57 to corresponding contoured portions 55, 56 of outer ring 54. Paddles 58, 59 are oppositely pitched so that during rotation of the crushing disk 12 ice in front of the paddles 58, 59 is forced against the bottom of the crushing module and against blade 10 located about funnel 11.

Figure 4:
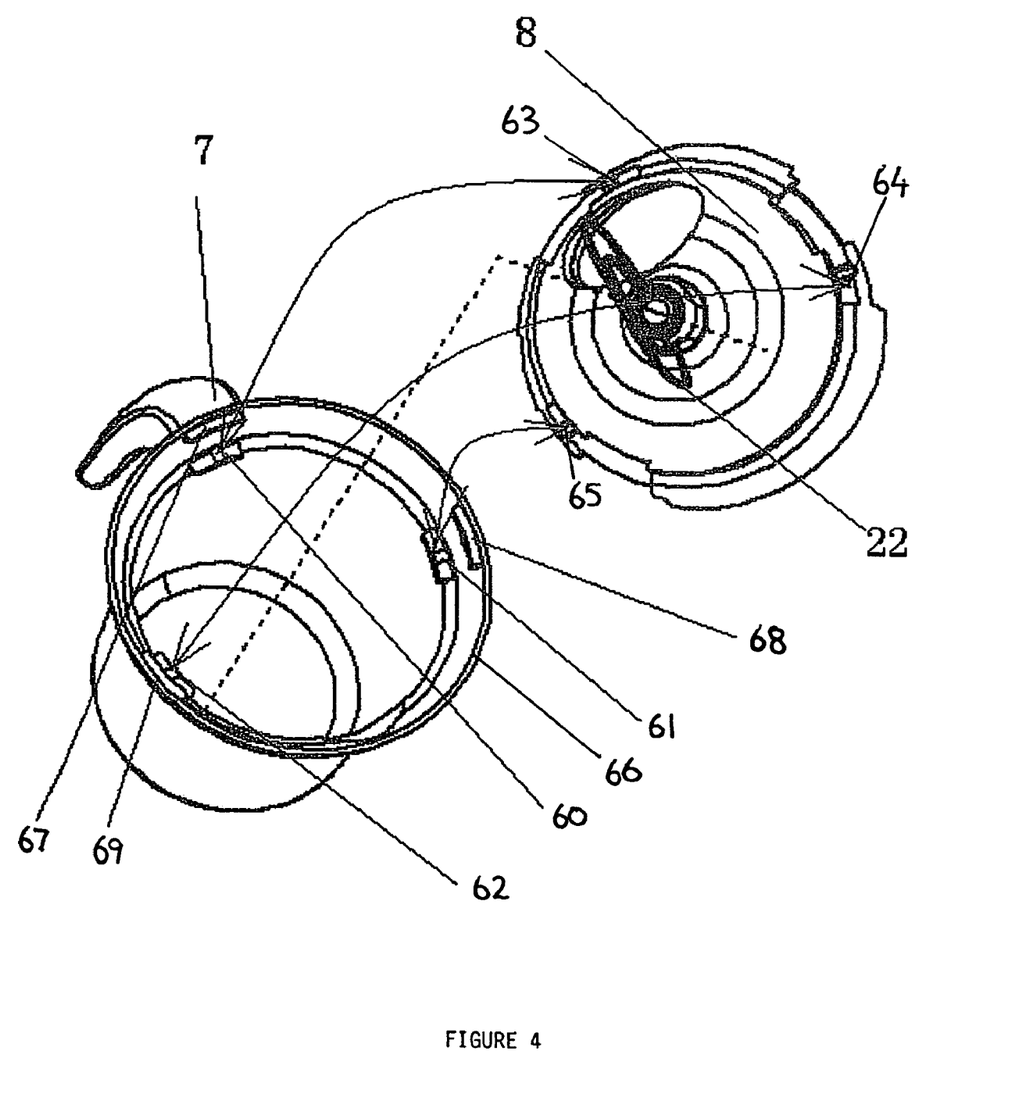
FIG. 4 is a schematic parts-exploded perspective illustration of a blending nodule forming part of the appliance of FIGS. 1 to 3.
Figure 5:
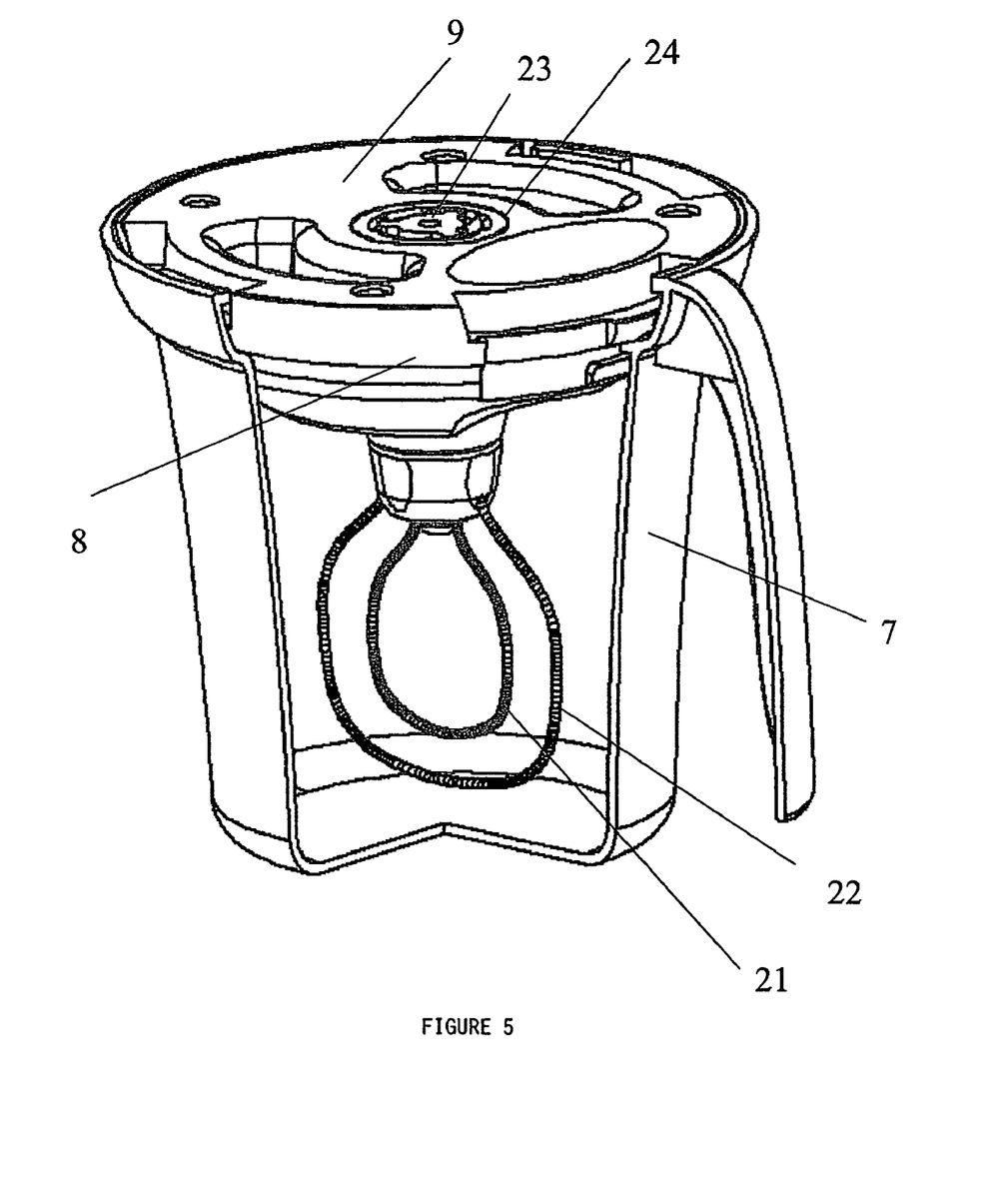
FIG. 5 is a schematic cut-away perspective illustration of the blending module.
Figure 6:
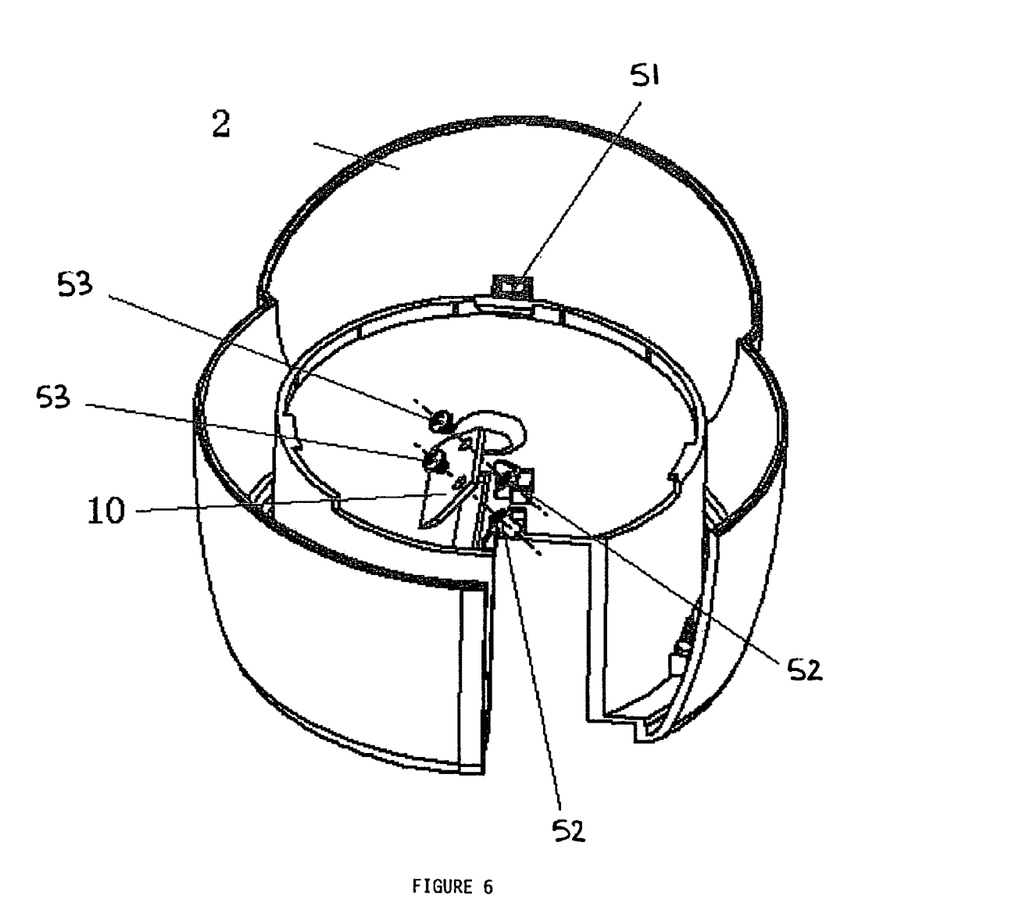
FIG. 6 is a schematic perspective illustration of an ice crushing module forming part of the appliance of FIGS. 1 to 3.
Figures 9, 10:
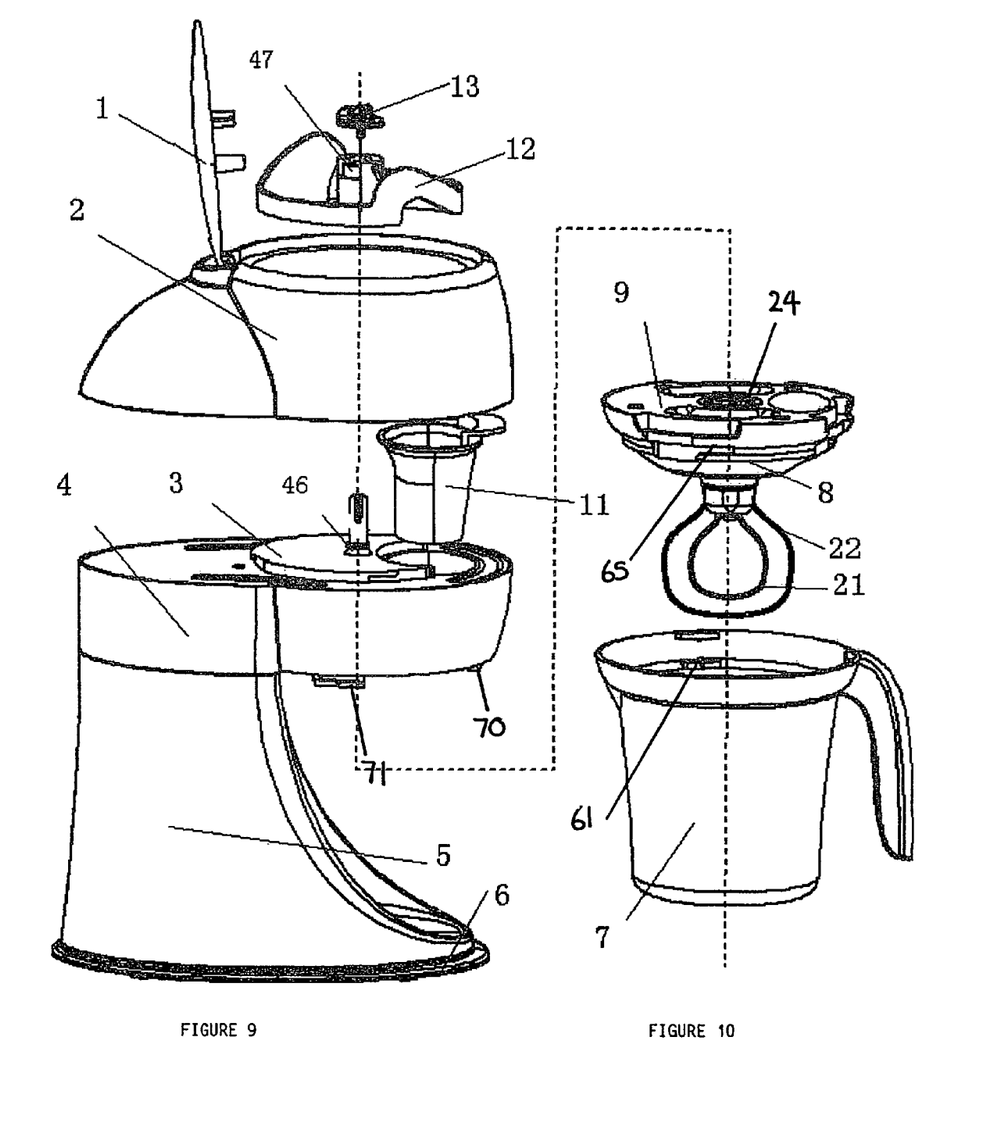
FIG. 9 is a schematic parts-exploded perspective illustration of the appliance.
FIG. 10 is a schematic parts-exploded perspective illustration of the blending module.
Figure 11:
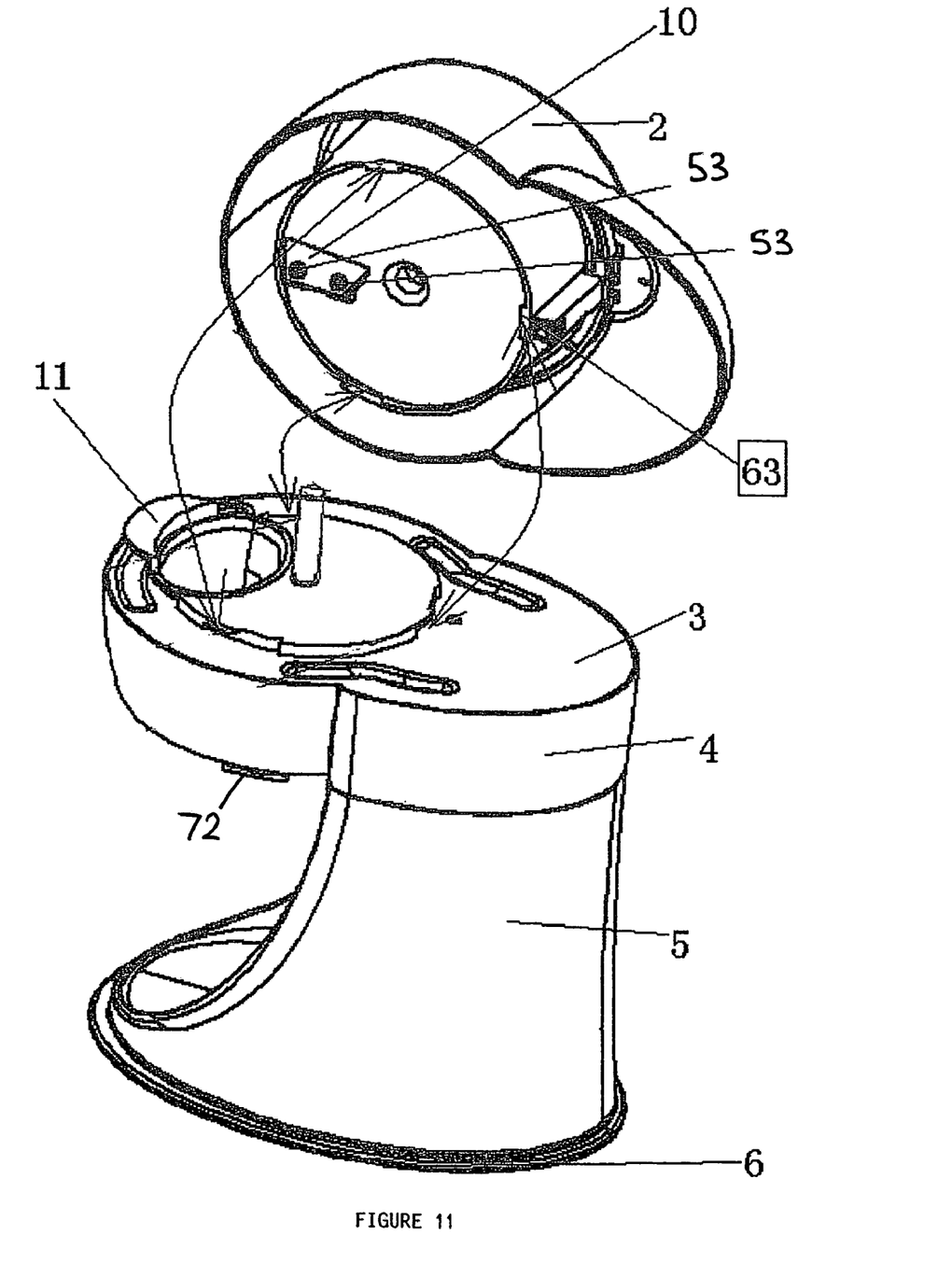
FIG. 11 is a schematic perspective illustration of the apparatus having the crushing module raised therefrom.

The blending module comprises a vessel 7 into which a pair of whisks 21 and 22 depend. The vessel has a lid comprising a housing formed by lid upper 9 and lid lower 8. The pair of whisks 21 and 22 depend from lid lower 8. The main shaft lower 38 couples with a splined input 24 positioned at the lid upper 9. There is a shaft-within-shaft arrangement from which the whisks 21 and 22 depend. The first whisk 21 is coupled to the inner shaft of the shaft-within-shaft arrangement and the second whisk 22 is coupled to the outer shaft of the shaft-within-shaft arrangement. Positioned within the lid housing is a blending torque transmission comprising gears 42, 43, 44 and 45 for rotating the inner and outer shafts of the shaft-within-shaft arrangement at different speeds and directions. This arrangement results in rotational speed and direction of the whisks being different from one another to assist efficient blending.

Evenly spaced about the inside of vessel 7 and positioned below the vessel upper lip 66 are three tabs 60, 61, 62. The outer periphery of the vessel lid has three slots 63, 64, 65. The combination of tabs 60, 61, 62 and slots 63, 64, 65 provide a bayonet type releasable engagement for the vessel lid within the upper opening of the vessel 7. Evenly spaced about the upper lip 66 of the vessel 7 are a further three tabs 67, 68, 69. There are three corresponding projections 70, 71, 72 from a lower part of intermediate housing 4. The projections 70, 71, 72 have slots that provide a bayonet type connection with tabs 67, 68, 69 on upper 66 of the vessel 7. In this way, vessel 7 can be removably engaged with intermediate housing 4 to provide safe blending and hand free operation of the beverage making appliance.

In use, syrup for example is placed within the vessel 7 and the vessel lid and whisks are inserted into the vessel. The vessel is then placed upon the base 5 and ice is placed in the ice crushing module as described above. Activation of electric switch will initiate the electric motor which will in turn commence rotation of the crushing disk 12 and whisks 21 and 22. Shaved ice is delivered via the funnel 11 to the blending module for blending with the syrup. This vessel containing this concoction can then be removed to be decanted and subsequently imbibed at will.

The crushing module can also shave other things besides ice cubes such as frozen fruits, frozen ice cream, nuts, crackers, chocolates etc or mixtures of the above at the same time.

The apparatus has the advantage of performing the functions of shaving and blending in one single step for the consumer It should be appreciated that modifications and alterations obvious to those skilled in the art are not to be considered as beyond the scope of the present intention. For example, a belt-drive pulley arrangement might replace the gearbox.

The invention claimed is:

1. A beverage-making apparatus, comprising:
a housing,
an electric motor located within the housing,
a torque transmission supported by the housing and receiving input from the electric motor and providing a first output shaft and a second-speed output shaft that rotates at a different speed than the first output shaft,
a crushing module supported by the housing and receiving torque from the first output shaft, and
a blending module comprising a whisk driven by the second-speed output shaft, a vessel into which the whisk depends and a vessel lid fitted to the vessel, the vessel lid comprising a vessel lid upper having a coupling attached to the second-speed Output shaft, and a lid lower through which torque is transmitted from the coupling to the whisk.

2. The apparatus of claim 1 wherein the second-speed output shaft rotates at a different speed and in a different direction than the first output shaft.

3. The apparatus of claim 1 wherein the crushing module comprises a contoured crushing disk that bears down upon a beverage ingredient, and a blade against which the beverage ingredient is crushed by the crushing disk.

4. The apparatus of claim 3 wherein the crushing disk is attached to the first output shaft.

5. The apparatus of claim 1 further comprising a second whisk driven by the first output shaft, and wherein the second-speed output shaft rotates at a different speed and in a different direction than the first output shaft.

6. The apparatus of claim 1 wherein the torque transmission comprises a gearbox.

7. The apparatus of claim 5 wherein the first and second output shafts are co-linear and extend from opposite sides of the gearbox.

8. The apparatus of claim 1 wherein the housing comprises a base upon which the vessel is supported.

9. The apparatus of claim 1 wherein the crushing module comprises a hinged lid.

10. The apparatus of claim 1 further comprising a blade against which the beverage ingredient is crushed by the crushing disk and a funnel depending from the blade toward the blending module.

11. A beverage-making apparatus, comprising:
a housing,
an electric motor located within the housing,
a torque transmission supported by the housing and receiving input from the electric motor and providing an output,
a crushing module supported by the housing and receiving torque from the output, the crushing module comprising a contoured crushing disk having a boss, an outer ring coaxial with the boss and two diametrically opposed contoured paddies positioned between the boss and the outer ring for bearing down upon the beverage ingredient, and a blade against which the beverage ingredient is crushed by the crushing disk, and
a blending module receiving torque from the output, and positioned to receive the beverage ingredient crushed by the crushing disk.

12. The apparatus of claim 11 wherein the boss includes a bore having splines for coupling with the output.

13. The apparatus of claim 11 wherein the paddles have a pitch that forces beverage ingredient at a front of the paddles against the blade.

14. A beverage-making apparatus, comprising:
a housing,
an electric motor located within the housing,
a torque transmission supported by the housing and receiving input from the electric motor and providing an output,
a crushing module supported by the housing and receiving torque from the output, the crushing module comprising a contoured crushing disk that bears down upon a beverage ingredient, and a blade against which the beverage ingredient is crushed by the crushing disk, and
a blending module positioned to receive the beverage ingredient crushed by the crushing disk, the blending module comprising a blending housing having a coupling for receiving torque from the output, a second torque transmission supported by the blending housing and receiving input from the coupling and providing a first output shaft and a second-speed output shaft that rotates at a different speed than the first output shaft, the first output shaft being positioned within the second output shaft, and a first whisk receiving torque from the first output shaft and a second whisk receiving torque from the second output shaft.

15. The apparatus of claim 14 wherein the second output shaft rotates in a different direct to the first output shaft.

16. A beverage-making apparatus, comprising:
a housing,
an electric motor located within the housing,
a torque transmission supported by the housing and receiving input from the electric motor and providing a first output shaft and a second-speed output shaft that rotates at a different speed than the first output shaft,
a crushing module supported by the housing and receiving torque from the first output shaft, and
a blending module receiving torque from the second output shaft, the blending module comprising a first whisk driven by the second-speed output shaft, a second whisk driven by the first output shaft and a vessel into which the whisks depend.

17. The apparatus of claim 16 wherein the second-speed output shaft rotates at a different speed and in a different direction than the first output shaft.

18. The apparatus of claim 16 wherein the crushing module comprising a contoured crushing disk having a boss, an outer ring coaxial with the boss and two diametrically opposed contoured paddles positioned between the boss and the outer ring for bearing down upon the beverage ingredient, and a blade against which the beverage ingredient is crushed by the crushing disk.

19. The apparatus of claim 16 wherein the blending module further comprises a vessel lid comprising a vessel lid upper having a coupling attached to the second-speed output shaft, and a lid lower through which torque is transmitted from the coupling to the whisk.

20. The apparatus of claim 16 wherein the first and second output shafts are co-linear and extend from opposite sides of the gearbox.

21. A beverage-making apparatus, comprising:
a housing,
an electric motor located within the housing,
a torque transmission supported by the housing and receiving input from the electric motor and providing a first output shaft and a second-speed output shaft that rotates at a different speed than the first output shaft,
a crushing module supported by the housing and comprising a contoured crushing disk driven by the first output shaft and having a boss, an outer ring coaxial with the boss and two diametrically opposed contoured paddles positioned between the boss and the outer ring for bearing down upon the beverage ingredient, and a blade against which the beverage ingredient is crushed by the crushing disk, and
a blending module comprising a whisk driven by the second-speed output shaft a vessel into which the whisk depends and a vessel lid fitted to the vessel, the vessel lid comprising a vessel lid upper having a coupling attached to the second-speed output shaft, and a lid lower through which torque is transmitted from the coupling to the whisk.

22. The apparatus of claim 21 further comprising a second whisk driven by the first output shaft, and wherein the second-speed output shaft rotates at a different speed and in a different direction than the first output shaft.

* * * * *

UNITED STATES PATENT AND TRADEMARK OFFICE
CERTIFICATE OF CORRECTION

| | |
|---|---|
| PATENT NO. | : 7,395,751 B2 |
| APPLICATION NO. | : 10/789650 |
| DATED | : July 8, 2008 |
| INVENTOR(S) | : Liu |

Page 1 of 1

It is certified that error appears in the above-identified patent and that said Letters Patent is hereby corrected as shown below:

<u>Column 4</u>:
Line 38, delete "Output" and substitute --output--.

<u>Column 5</u>:
Line 11, delete "paddies" and substitute --paddles--.

Signed and Sealed this

Twenty-first Day of October, 2008

JON W. DUDAS
*Director of the United States Patent and Trademark Office*